July 29, 1969 P. L. MENISSIER 3,457,830
MILLING MACHINE
Filed Oct. 12, 1967 2 Sheets-Sheet 1

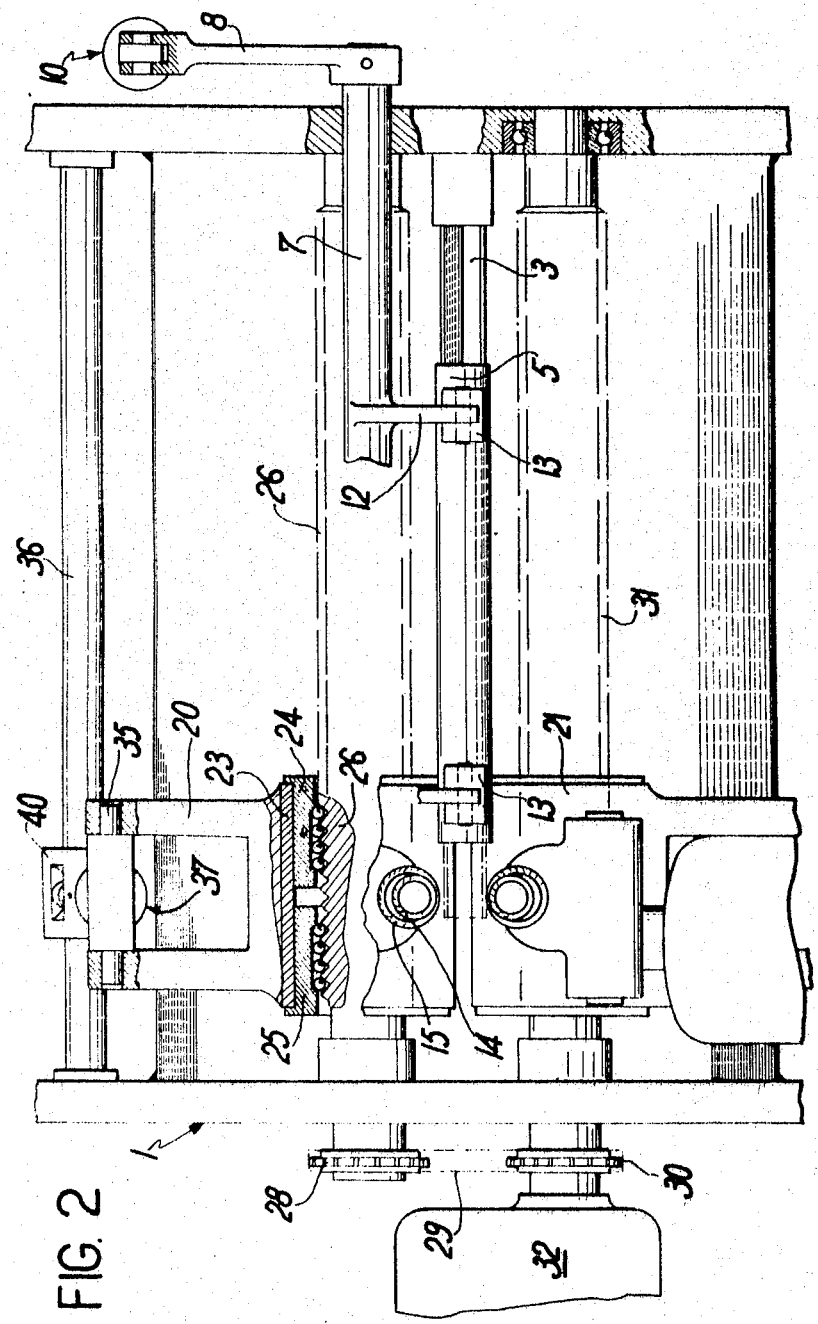

United States Patent Office 3,457,830
Patented July 29, 1969

3,457,830
MILLING MACHINE
Pierre Lucien Menissier, Grenoble, France, assignor to Commissariat à l'Energie Atomique, Paris, France
Filed Oct. 12, 1967, Ser. No. 674,816
Int. Cl. B23c 3/28, 1/00, 3/00
U.S. Cl. 90—15                                              7 Claims

ABSTRACT OF THE DISCLOSURE

A milling machine for cutting grooves of predetermined depth along the generator-lines of a can surrounding a nuclear reactor fuel rod. The machine comprises a stationary frame for supporting the canned fuel rod, at least one ball-worm which is driven in rotation from a motor unit, a carriage which cooperates with the worm, a set of milling cutters rotating about a shaft located at right angles to the axis of the fuel rod, a reaction rod which is parallel to the worm, and an articulated coupling unit of variable length for providing a coupling between the reaction rod and the carriage in order to produce the pivotal motion of the carriage about the worm, thereby causing the milling cutters to penetrate into the surface of the fuel rod can.

---

This invention relates to a milling machine which is designed primarily for the purpose of cutting grooves of predetermined depth along generator-lines of a tubular element of cylindrical configuration, said element being mainly intended to constitute the metallic cladding or can which surrounds a fuel rod of the type employed in nuclear reactors, although other applications may also be contemplated.

The separation of cans of this type from the solid or hollow rods of fissile material contained therein is an essential operation prior to chemical processing of these fuel rods for the recovery of fission products after utilization of the fuel in a nuclear reactor. Provision must accordingly be made or a machine which cuts the fuel cans, preferably by milling, in such a manner as to cut them into fragments which can then be readily removed without any danger of flaking or detachment of irradiated fissile material.

The present invention is directed to a milling machine which is primarily designed to cut metallic cylindrical cans of the type referred-to. By reason of the special conditions in which it is employed, this machine can be entirely operated from a distance in order that, on the one hand, the milling cutters should perform a radial movement as they advance into the cans to be cut and that, on the other hand, said milling cutters should move parallel to the axes of the cans in order to cut these latter along parallel generator-lines.

To this end, the milling machine under consideration is characterized in that it comprises in combination a stationary frame for supporting the cylindrical element to be milled, at least one high-precision ball-worm mounted on the frame parallel to the axis of said element and driven in rotation from a motor unit, a carriage adapted to cooperate with said worm, said carriage being secured against rotation but capable of moving freely in a translational movement which is produced by the movement of rotation of said worm, a set of milling cutters rotatable about a shaft which is carried by said carriage and located at right angles to the axis of said element, a second motor unit rigidly fixed to said carriage and adapted to drive the shaft of said milling cutters in rotation, a reaction rod which is parallel to said worm and rigidly fixed to said stationary frame, and an articulated unit of variable length for providing a coupling between said reaction rod and said carriage in order that a variation in the length of said coupling unit should produce the pivotal motion of said carriage about said worm and the limited tilting motion of said shaft so as to cause said milling cutters to penetrate into the surface of said cylindrical element.

In a preferred embodiment of the invention, the milling machine under consideration comprises two parallel ball-worms associated with two reaction rods and with two identical carriages each comprising one set of two milling cutters, both carriages being disposed symmetrically with respect to the mid-plane of said stationary frame in which said cylindrical element is disposed.

By virtue of these arrangements, the cylindrical element is cut along four parallel generator-lines determined by the milling cutters which are associated with the two carriages, each carriage being capable of carrying out in addition to a longitudinal displacement along the corresponding ball-worm a radial displacement which causes the milling cutters to penetrate into the surface of the cylindrical element, said radial displacement being obtained by the pivotal motion of each carriage about its ball-worm under the action of its variable-length unit which provides a coupling between said carriage and the reaction rod.

Each carriage preferably comprises a cylindrical bore which is traversed by the corresponding ball-worm and two nuts which are rigidly fixed to said carriage at the ends of said bore and adapted to cooperate with said worm by bearing thereon simultaneously at two points in order to guide said carriage over a suitable distance. As an advantageous feature, the distance over which the nuts are applied against the ball-worm is greater than double the diameter of said worm.

In accordance with another feature, the articulated variable-length unit which provides a coupling between each carriage and the reaction rod is constituted by a hydraulic jack, the body of said jack being pivoted to said carriage about an axis located parallel to the corresponding ball-worm and the operating-rod of said jack being secured to said reaction rod by means of a sliding coupling which permits the displacement of said carriage along said worm.

Finally, and in accordance with a particular feature of the milling machine under consideration, the cylindrical element is stationarily fixed on the support frame by means of a locking device comprising at least one rocking lever secured to a shaft which is parallel to said element, a link-arm which is secured to said shaft, and an auxiliary jack which actuates said link-arm and the body of which is pivoted about a shaft carried by said support frame.

The complementary description which now follows relates to one exemplified embodiment which is given solely by way of indication and not in any limiting sense, reference being had to the accompanying drawings, in which:

FIG. 2 is a part-sectional top view of the milling machine which is shown in FIG. 1.

Figure 1:
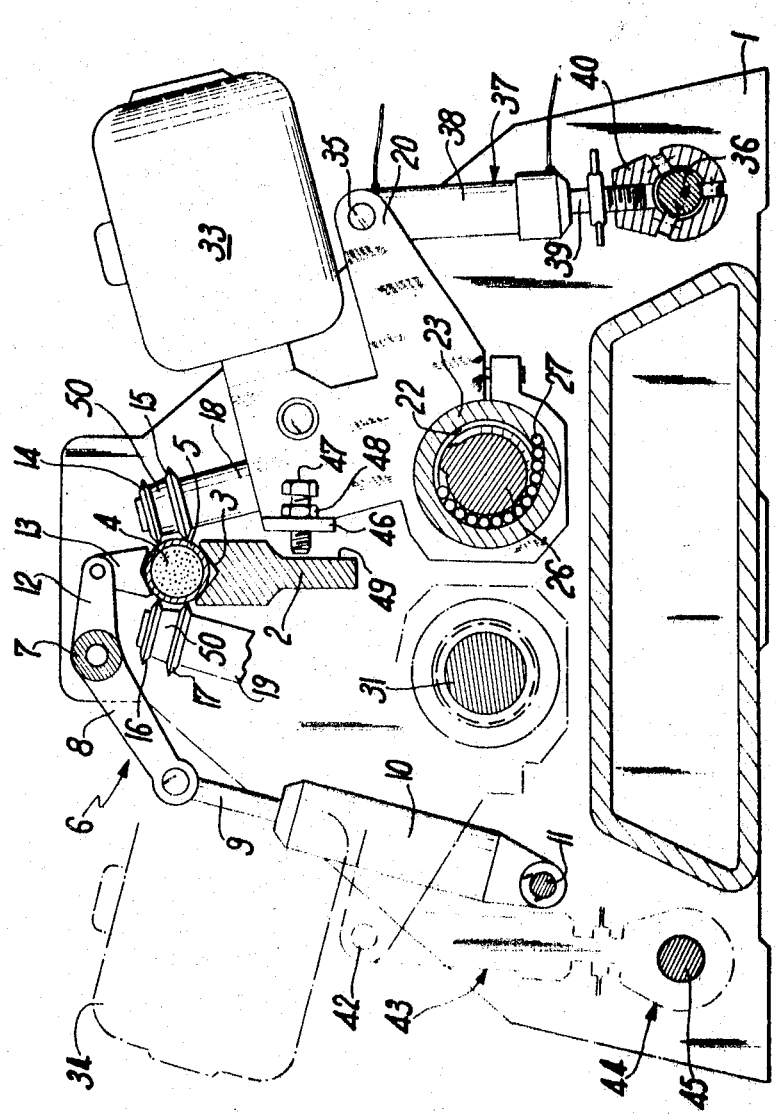
FIG. 1 is a diagrammatic vertical sectional view of a milling machine which is constructed in accordance with the invention.

As can be seen from these figures, the milling machine under consideration comprises a frame 1 which is rigidly fixed in position on a stationary base (not shown in the drawings). Said frame comprises a support member 2 which is disposed in its central plane of symmetry, a recess 3 being formed at the top of said support member for the purpose of holding a cylindrical element to be machined.

In the example of construction which is more especially considered, said element consists of a rod or slug 4 of fissile material surrounded by a cylindrical metallic can 5; the complete assembly constitutes a fuel element of a type which is commonly employed in nuclear reactors. Once it is placed on its support 2 inside the frame 1, the canned fuel rod is secured in position by means of a locking device 6 comprising a shaft 7 which is carried by the frame and rigidly fixed to a control link-arm 8, the extremity of which is pivotally attached to the operating-rod 9 of a jack 10, the jack body being in turn pivotally mounted on a pin 11 which is integral with the frame 1. The shaft 7 is provided with transverse lugs 12 (which are two in number in the example considered). Said lugs terminate in bearing members 13 which are applied against the canned fuel rod as a result of a suitable pivotal movement of the arm 8 which is accompanied by a movement of rotation of the shaft 7.

In accordance with the invention, the can 5 of the fuel rod 4 which is thus locked in position can be cut along parallel generator-lines by means of a plurality of milling tools which are shown in constructional detail in both figures. In the example which is contemplated, these milling tools are four in number and designated respectively by the reference numerals 14 and 15 on the one hand, 16 and 17 on the other hand, each tool being designed in the form of a circular cutter which rotates about an axis at right angles to that of the fuel rod 4. The milling cutters 14 and 15 are carried by a shaft 18 and the milling cutters 17 are carried by a shaft 19. Both shafts are symmetrical with each other with respect to the mid-plane of the apparatus which passes through the axis of the fuel rod 4, these shafts being associated with two longitudinal-traverse carriages designated respectively by the reference numerals 20 and 21. In FIG. 1, there is only shown the carriage 20, the different components of which are identical in every respect with those of the carriage 21.

The carriage 20 comprises a transverse bore 22 which is oriented in a direction parallel to the axis of the can 5 of the fuel rod 4 and delimited by a bushing 23, the extremities of which are rigidly fixed to two nuts 24 and 25. Said nuts are mounted in such a manner as to co-operate with a lead-screw or worm 26. A continuous thread is machined with very high precision in the outer surface of said worm for the purpose of placing balls 27 therein so that, when said worm is endowed with a suitable movement of rotation, there is thus produced a movement of displacement of the nuts 24 and 25, and consequently of the carriage 20 to which said nuts are rigidly fixed. The worm 26 is rotatably mounted in the frame 1 and is fitted at one end with a sprocket-wheel 28 which engages with a chain 29, said chain being in turn adapted to engage with a second sprocket-wheel 30 mounted at the end of a second worm 31 which is identical with the worm 26 but which is intended to drive the carriage 21. By virtue of these arrangements, the two worms 26 and 31 are driven in rotation and in synchronism by means of a reduction-gear motor unit 32 which is mounted outside the frame, the two carriages 20 and 21 being thus driven simultaneously in a direction parallel to the axis of the fuel rod 4 and its can 5.

By means of a second reduction-gear motor unit 33 which is mounted on the carriage 20, the shaft 18 which supports the milling cutters 14 and 15 is driven in rotation about its axis by a mechanical transmission system of a conventional type which is not shown in the drawings. Similarly, the carriage 21 is adapted to support an identical reduction-gear motor unit 34 for the movement of rotation of the shaft 19 and corresponding milling cutters 16 and 17.

Finally, the carriage 20 comprises a variable-length unit which is pivoted about a horizontal pin 35, the function of said unit being to provide a coupling between said carriage and a reaction rod 36 which is rigidly fixed with respect to the frame 1 and parallel to the worm 26. The variable-length unit referred-to is constituted by a jack 37, the body 38 of which is pivoted to the carriage 20 about the pin 35 and the operating-rod 39 of which is coupled to a guide 40 which surrounds the reaction rod 36 but is free to slide along this latter. The coupling which is thus provided between the reaction rod 36 and the carriage 20 locks this latter rotationally with respect to the worm, while making it possible to convert the movement of rotation of said worm into a movement of translation in a direction parallel to the axis of the fuel rod 4. On the other hand, a variation in the length of the jack 37 corresponding to a movement of given amplitude either in one direction or the other of its operating-rod 39 with respect to the jack body 38 produces the pivotal motion of the carriage 20 and consequently of the associated shaft 18 which supports the milling cutters 14 and 15.

As is readily apparent, an identical arrangement is provided in the case of the carriage 21; this latter comprises a pivot-pin 42 and a jack 43, the operating-rod of which terminates in a guide 44 surrounding a reaction rod 45 which is parallel to the reaction rod 36 and associated with the worm 31 of this second carriage.

The operation of the milling machine as thus constructed is as follows: once the fuel rod 4 surrounded by its can 5 is rigidly secured to the frame in its support 2 by means of the jack 10, the carriages 20 and 21 located in a starting position corresponding to one of the extremities of the two worms 26 and 31 are caused to pivot about their respective worms by virtue of the appropriate operation of the two jacks 37 and 43. As has been noted in the foregoing, this operation produces both the pivotal motion of the two carriages and the swinging motion of the milling-cutter shafts 18 and 19 through a circular arc of predetermined length. The swinging motion referred-to is controlled so as to make a cut of exactly calculated depth in the can 5 by means of said milling cutters. It should be noted that, in order to limit the pivotal motion of the carriages, provision is advantageously made on each carriage for a stop such as that shown at 46 on the carriage 20. Said stop comprises a screw 47 which is locked by a nut 48 and brought to bear on the extremity 49 of the support member 2 in order to prevent the milling cutters 14 and 15 shown in the figure from penetrating too far into the can 5 and thus entailing the risk of damaging the fuel rod 4 itself.

Once the pivotal motion of the shafts 18 and 19 of the carriages 20 and 21 has thus been brought about by the jacks 37 and 43, the two worms 26 and 31 are driven in rotation by the reduction-gear motor unit 32. Since the carriages 20 and 21 are secured against rotation by the reaction rods 36 and 45, the driven motion of the worms produces the translational motion of said carriages in a direction parallel to the axis of the fuel rod 4. The milling cutters 14 and 15 on the one hand, 16 and 17 on the other hand are simultaneously driven in rotation about the axes of their respective shafts by the reduction-gear motor units 33 and 34, with the result that said milling cutters cut into the can 5 and make four grooves in this latter along parallel generator-lines progressively as the movement of displacement of the carriages takes place. At the end of travel, the carriages are moved back to their initial position by producing the movement of rotation of the worms 26 and 31 in the opposite direction. Upon completion of this movement, another canned fuel rod is put in the place of the element which has just been cut and the operation can then be repeated.

The effort which is exerted on the milling cutters as a result of the pivotal motion of the carriages under the action of their jacks 37 and 43 must be greater than the effort required to cut the cans. However, the amplitude of the movement is limited as will be pointed out later by virtue of the stops which are provided on said carriages. Moreover, the carriages can be guided along their ball-worms under conditions of very high precision by virtue of the presence of the nuts which are secured to said carriages and applied against their respective worms over a substantial distance. Preferably, the length of the nuts is greater than twice the diameter of the corresponding worm.

At the time of milling of the grooves or cuts, the distance pieces 50 which are located between the milling cutters 14 and 15 on the one hand and between the milling cutters 16 and 17 on the other hand bear on the fuel rod 4 and thus limit the pivotal motion of the carriages 20. By virtue of this arrangement, any elements which may have become deformed can thus be correctly machined.

The stop 46 comes into action when the carriage 20 is no longer located opposite to the fuel rod 4. It is apparent that said stop 46 may be employed as hereinabove described for the purpose of machining rectilinear workpieces or in the event that ordinary milling cutters are employed.

There is thus provided a milling machine which can readily be operated from a distance without any direct intervention on the part of an operator after the canned fuel rod has been positioned on its support in the frame of the machine. By switching-on the reduction-gear motor units and initiating the operation of the jacks which in turn produces the pivotal motion of the carriages, the cans are thus cut without causing any damage to the fuel rods contained therein. In a subsequent operation, the fragments of cans which are obtained can be removed prior to treatment of the fuel rods proper either by chemical processing or other methods.

As will readily be understood, the invention is not limited to the exemplified embodiment which has been described and illustrated but extends, on the contrary, to all alternative forms.

What I claim is:

1. A milling machine for cutting grooves of predetermined depth along the generator-lines of a cylindrical element, characterized in that it comprises a stationary frame for supporting the cylindrical element to be milled, at least one high-precision ball-worm mounted on the frame parallel to the axis of said element and driven in rotation from a motor unit, a carriage adapted to cooperate with said worm, said carriage being secured against rotation but capable of moving freely in a translational movement which is produced by the movement of rotation of said worm, a set of milling cutters rotatable about a shaft which is carried by said carriage and located at right angles to the axis of said element, a second motor unit rigidly fixed to said carriage and adapted to drive the shaft of said milling cutters in rotation, a reaction rod which is parallel to said worm and rigidly fixed to said stationary frame, and an articulated coupling unit of variable length for providing a coupling between said reaction rod and said carriage in order that a variation in the length of said coupling unit should produce the pivotal motion of said carriage about said worm and the limited tilting motion of said shaft so as to cause said milling cutters to penetrate into the surface of said cylindrical element.

2. A milling machine in accordance with claim 1, characterized in that it comprises two parallel ball-worms associated with two reaction rods and with two identical carriages each comprising one set of two milling cutters, both carriages being disposed symmetrically with respect to the mid-plane of said stationary frame in which said cylindrical element is disposed.

3. A milling machine in accordance with claim 2, characterized in that each carriage comprises a cylindrical bore which is traversed by the corresponding ball-worm and two nuts which are rigidly fixed to said carriage at the ends of said bore and adapted to cooperate with said worm by bearing thereon simultaneously at two points in order to guide said carriage over a suitable distance.

4. A milling machine in accordance with claim 3, characterized in that the distance over which the nuts are applied against the associated ball-worm is greater than double the diameter of said worm.

5. A milling machine in accordance with claim 1, characterized in that the articulated variable-length unit is constituted by a hydraulic jack, the body of said jack being pivoted to said carriage about an axis located parallel to the ball-worm and the operating-rod of said jack being secured to said reaction rod by means of a sliding coupling which permits the displacement of said carriage along said worm.

6. A milling machine in accordance with claim 1, characterized in that the cylindrical element is stationarily fixed on the support frame by means of a locking device comprising at least one rocking lever secured to a shaft which is parallel to said element, a link-arm which is secured to said shaft, and an auxiliary jack which actuates said link-arm and the body of which is pivoted about a shaft carried by said support frame.

7. A milling machine in accordance with claim 1, substantially as hereinbefore described with reference to and as illustrated in the accompanying drawings.

References Cited

UNITED STATES PATENTS

| | | | |
|---|---|---|---|
| 1,378,865 | 5/1921 | Hibbard | 90—15 |
| 1,695,513 | 12/1928 | Travis | 90—15 |
| 2,187,550 | 1/1940 | Tow | 90—15 |
| 3,301,135 | 1/1967 | Jenkins | 90—15 |

GERALD A. DOST, Primary Examiner